United States Patent
Yamae

(10) Patent No.: US 10,344,947 B2
(45) Date of Patent: Jul. 9, 2019

(54) LIGHT EMITTER AND LIGHT EMITTING DEVICE

(71) Applicant: PANASONIC INTELLECTUAL PROPERTY MANAGEMENT CO., LTD., Osaka (JP)

(72) Inventor: Kazuyuki Yamae, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/018,803

(22) Filed: Jun. 26, 2018

(65) Prior Publication Data

US 2019/0003681 A1 Jan. 3, 2019

(30) Foreign Application Priority Data

Jun. 30, 2017 (JP) .................................. 2017-128323

(51) Int. Cl.
*F21V 7/26* (2018.01)
*F21V 9/32* (2018.01)
(Continued)

(52) U.S. Cl.
CPC .................. *F21V 9/32* (2018.02); *F21V 7/26* (2018.02); *G02B 5/0858* (2013.01); *G03B 21/204* (2013.01)

(58) Field of Classification Search
CPC ...... F21V 7/26; F21V 9/32; F21V 9/20; F21V 9/30; G02B 5/0858; G02B 5/20; G03B 21/204; F21K 9/64; F21Y 2115/10
See application file for complete search history.

(56) References Cited

U.S. PATENT DOCUMENTS 9,605,832 B2 * 3/2017 Yamanaka ........... C09K 11/025
10,047,285 B2 * 8/2018 Fujita ...................... C09K 5/14
(Continued)

FOREIGN PATENT DOCUMENTS

JP 2007-258276 10/2007
JP 2009-260316 11/2009
(Continued)

*Primary Examiner* — Peggy A Neils
(74) *Attorney, Agent, or Firm* — Greenblum & Bernstein, P.L.C.

(57) ABSTRACT

A light emitter includes a light emitting layer and a reflection layer. The reflection layer includes a first dielectric film and a dielectric multi-layer film. The dielectric multi-layer film includes at least one layer of laminated film, in which each layer of laminated film includes a pair of a second dielectric film and a third dielectric film. The first dielectric film has a refractive index lower than a refractive index of the light emitting layer and the second dielectric film. The third dielectric film has a refractive index lower than the refractive index of the second dielectric film. A relationship of $d_1 \geq \lambda_{ave}/n_1$ is satisfied, where $\lambda_{ave}$ denotes an average wavelength of a spectrum of visible light emitted via the light emitting layer, $n_1$ denotes the refractive index of the first dielectric film, and $d_1$ denotes a film thickness of the first dielectric film.

20 Claims, 10 Drawing Sheets

(51) Int. Cl.
*G02B 5/08* (2006.01)
*G03B 21/20* (2006.01)

(56) References Cited

U.S. PATENT DOCUMENTS

2011/0018024 A1 1/2011 Fukshima et al.
2013/0250544 A1* 9/2013 Zink .................... H01L 33/505
                                                    362/84

FOREIGN PATENT DOCUMENTS

JP      5186259     1/2013
JP      5608340     9/2014

* cited by examiner

LIGHT EMITTER AND LIGHT EMITTING DEVICE

CROSS REFERENCE TO RELATED APPLICATION

This application claims the benefit of priority of Japanese Patent Application Number 2017-128323 filed on Jun. 30, 2017, the entire content of which is hereby incorporated by reference.

BACKGROUND

1. Technical Field

The present disclosure relates to light emitters and light emitting devices, and particularly to a light emitter which emits light upon receiving excitation light and a light emitting device which includes the light emitter.

2. Description of the Related Art

Conventionally, a technique of forming a reflection film on a surface opposite to a light emission surface (light extraction surface) of a light emitting layer has been proposed so as to increase light extraction efficiency of a solid-state light emitting element such as a semiconductor light emitting element.

Forming of such a reflection film enables inhibiting a loss of light generated in the light emitting layer, due to multiple reflection inside the element. More specifically, light generated in a light emitting layer has a property of traveling in all directions, and the amount of light emitted in a direction oblique to a luminous point (i.e., light with a small emission angle) is greater than the amount of light emitted directly upward from the luminous point (i.e., light with a large emission angle) as illustrated in FIG. 15. Accordingly, a majority of the light generated in the light emitting layer is lost due to multiple reflection inside the element. In view of the above, a reflection film is formed on a surface opposite to a light emission surface of the light emitting layer, thereby causing light generated in the light emitting layer to be reflected by the reflection film. In this manner, it is possible to inhibit a loss of light generated in the light emitting layer, due to multiple reflection inside the element. It is thus possible to increase the light extraction efficiency.

FIG. 16 illustrates a relationship between the reflectance and light extraction efficiency of such a reflection film. As is apparent from FIG. 16, in order to increase the light extraction efficiency to be 70% or higher, the reflectance of the reflection film is set to be 95% or higher. In addition, in a region in which the reflectance is 95% or higher, a curve that indicates the light extraction efficiency is steep, and the light extraction efficiency increases by as much as approximately 6% with an increase of the reflectance by only 1%.

Under the above-described circumstances, with conventional semiconductor light emitting elements such as light emitting diodes (LEDs) or semiconductor lasers, the light extraction efficiency is increased by using a metal reflection film in a portion of an electrode for supplying current to a light emitting layer that includes compound semiconductor (see, for example, Japanese Unexamined Patent Application Publication No. 2007-258276).

SUMMARY

However, materials used for a solid-state light emitting device are relatively high in a refractive index, and thus total reflection is likely to occur in an interface (light extraction surface) between the solid-state light emitting device and the air. Accordingly, it is difficult to prevent light generated in the light emitting layer from being reflected and extract the light directly to the outside. For that reason, the light generated in the light emitting layer is wave-guided through multiple wave guides and extracted to the outside. In this case, the light generated in the light emitting layer is wave-guided while being reflected inside the element, and thus light absorption loss occurs. As a result, it is difficult to realize a satisfactory level of light extraction efficiency.

In particular, a light emitter including an excitation-type light emitting layer (phosphor layer, etc.) which emits light upon receiving excitation light has a large light absorption loss inside the light emitter, and thus it is difficult to realize the satisfactory level of light extraction efficiency. For example, with a reflective and remote-phosphor light emitter which includes a phosphor layer, the light extraction efficiency is approximately no more than 60%.

The present disclosure has been conceived to solve the problem described above, and an object of the present disclosure is to provide a light emitter and a light emitting device with a high level of light extraction efficiency.

In order to achieve the above-described object, a light emitter according to one aspect of the present disclosure includes: a light emitting layer which includes a light emission surface, and emits visible light via the light emission surface; and a reflection layer which is disposed on a surface of the light emitting layer different from the light emission surface, which reflects the visible light emitted from the light emitting layer, and which includes a first dielectric film facing the light emitting layer, and a dielectric multi-layer film disposed below the first dielectric film to be further from the light emitting layer than the first dielectric film. In the light emitter, the dielectric multi-layer film includes at least one layer of laminated film, each layer of the at least one layer of laminated film includes a pair of a second dielectric film and a third dielectric film, the second dielectric film is disposed to be closer to the light emitting layer than the third dielectric film, the first dielectric film has a refractive index lower than a refractive index of the light emitting layer, the second dielectric film has a refractive index higher than the refractive index of the first dielectric film, the third dielectric film has a refractive index lower than the refractive index of the second dielectric film, and $d_1 \geq \lambda_{ave}/n_1$ is satisfied where $\lambda_{ave}$ denotes an average wavelength of a spectrum of the visible light emitted via the light emitting layer, $n_1$ denotes the refractive index of the first dielectric film, and $d_1$ denotes a film thickness of the first dielectric film.

In addition, a light emitting device according to one aspect of the present disclosure includes: the light emitter described above; and a light source which emits excitation light. In the light emitting device, the light emitting layer of the light emitter is an excitation-type light emitting layer which emits light upon receiving the excitation light emitted from the light source.

According to the present disclosure, it is possible to increase the light extraction efficiency.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

Hereinafter, embodiments of the present disclosure will be described with reference to the drawings. It should be noted that the embodiments described below each indicates one specific example of the present disclosure. Thus, the numerical values, shapes, materials, structural components, the disposition and connection of the structural components, and others described in the following embodiments are mere examples, and do not intend to limit the present disclosure. Furthermore, among the structural components in the following embodiments, components not recited in the independent claims each of which indicates the broadest concept of the present disclosure are described as arbitrary structural components.

It should be noted that the figures are schematic diagrams and are not necessarily precise illustrations. Accordingly, for example, scale sizes, etc., are not necessarily exactly represented. Moreover, in the figures, substantially identical components are assigned with the same reference signs, and overlapping description thereof is omitted or simplified.

Embodiment 1

Figure 1:
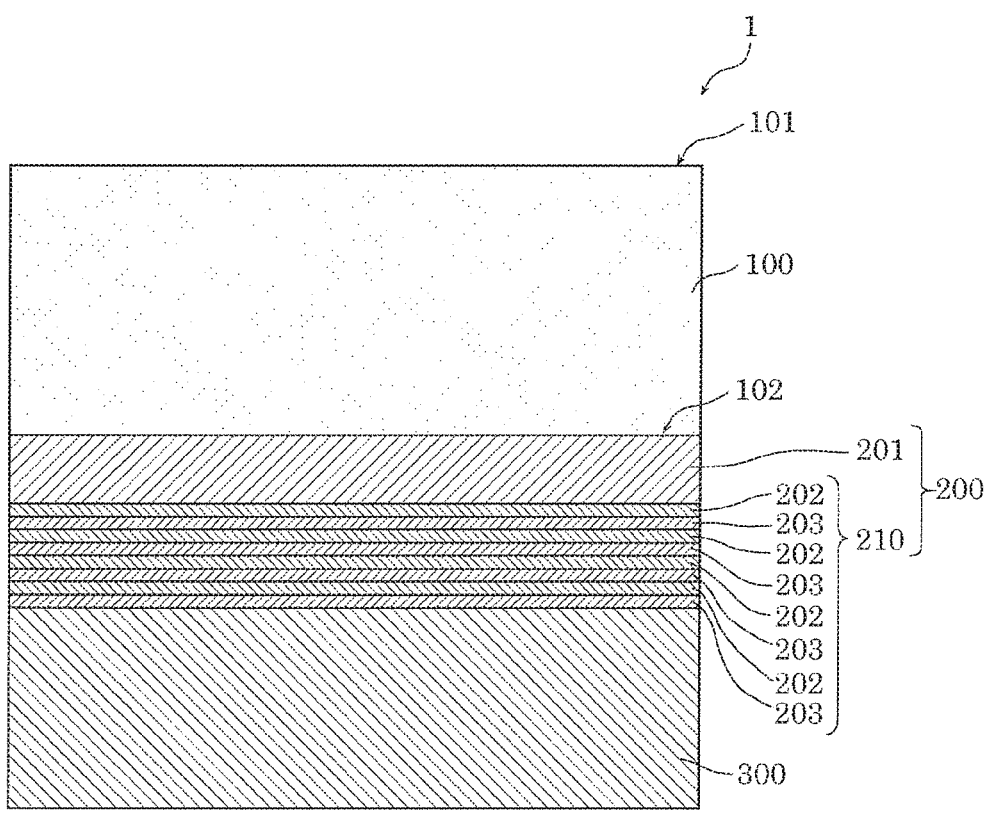
FIG. 1 is a cross-sectional view of a light emitter according to Embodiment 1.

First, a configuration of light emitter 1 according to Embodiment 1 shall be described with reference to FIG. 1. FIG. 1 is a cross-sectional view of light emitter 1 according to Embodiment 1.

As illustrated in FIG. 1, light emitter 1 includes light emitting layer 100 and reflection layer 200. According to the present embodiment, light emitter 1 further includes substrate 300. Light emitting layer 100 and reflection layer 200 are disposed above substrate 300. More specifically, reflection layer 200 is disposed on substrate 300, and light emitting layer 100 is disposed on reflection layer 200.

Light emitting layer 100 emits light of a visible light region (visible light) to the outside. According to the present embodiment, light emitting layer 100 is an excitation-type light emitting layer which emits light upon receiving excitation light. Light emitting layer 100 also functions as a wavelength converter which converts a wavelength of excitation light which is incident on light emitting layer 100.

More specifically, light emitting layer 100 is a phosphor layer including a phosphor (a phosphor particle), and emits fluorescent light having a predetermined wavelength in a visible light region as a result of being excited upon receiving excitation light. As one example, light emitting layer 100 is a yellow phosphor layer including a yellow phosphor such as a YAG (yttrium, aluminum, garnet) phosphor. In this case, light emitting layer 100 that is a yellow phosphor layer emits fluorescent light as a result of being excited upon receiving, as excitation light, light having a wavelength shorter than a wavelength of yellow light (e.g., ultraviolet light to blue light). In other words, in the yellow phosphor layer, the wavelength of excitation light is converted to a wavelength of yellow light which is longer than the wavelength of the excitation light.

As a phosphor layer, the following layers can be used: a phosphor-containing resin layer in which a phosphor is sealed by a transparent resin having a refractive index of approximately 1.5; a phosphor-containing glass layer in which a phosphor is sealed by a liquid glass having a refractive index of approximately 1.5; a phosphor-containing inorganic layer in which a phosphor is sealed by a transparent inorganic material such as Zinc oxide (ZnO) having a refractive index of approximately 2.0; a phosphor ceramic layer in which a phosphor is sealed by a ceramic sintered compact having a refractive index of approximately 1.8 as a single crystal, or the like.

Light emitting layer 100 includes first surface 101 and second surface 102 which is a surface on the side opposite to first surface 101. First surface 101 is a light emission surface, and light of light emitting layer 100 is emitted from first surface 101 that is the light emission surface to the outside. First surface 101 is an interface between light emitting layer 100 and an air layer, and a light extraction surface of light emitter 1. Second surface 102 is a surface of light emitting layer 100 located on the side facing reflection layer 200. In addition, second surface 102 is an interface between light emitting layer 100 and reflection layer 200.

For example, in the case where light emitting layer 100 is a yellow phosphor layer containing a yellow phosphor, when blue light is incident on light emitting layer 100, the yellow phosphor in light emitting layer 100 absorbs a portion of the blue light, and is excited to emit yellow fluorescent light. The yellow fluorescent light and another portion of the blue light which is not absorbed by the yellow phosphor are mixed to be white light, and the white light is emitted from first surface 101 (light emission surface) of light emitting layer 100 to the outside. In this case, light emitter 1 is a white light source, and the white light which includes a blue light component and a yellow light component is emitted from first surface 101 (light emission surface) of light emitting layer 100 as light in the visible light region.

It should be noted that, in the case where light emitting layer 100 is a yellow phosphor layer containing a yellow phosphor, when ultraviolet light is incident on light emitting layer 100, the yellow phosphor in light emitting layer 100 absorbs a portion of the ultraviolet light, and is excited to emit yellow fluorescent light. In this case, light emitter 1 is a yellow light source, and only the yellow fluorescent light is emitted from first surface 101 of light emitting layer 100 as light in the visible light region.

Reflection layer 200 reflects light emitted by light emitting layer 100. According to the present embodiment, reflection layer 200 has a property of reflecting light emitted from light emitting layer 100 and transmitting excitation light. For example, when light emitting layer 100 is a yellow phosphor layer and excitation light is ultraviolet light or blue light, reflection layer 200 has a property of reflecting at least yellow light and transmitting ultraviolet light or blue light.

Reflection layer 200 is formed on a surface of light emitting layer 100 different from first surface 101 of light emitting layer 100. According to the present embodiment, reflection layer 200 is formed on second surface 102 of light emitting layer 100. In other words, light emitting layer 100 is formed on an upper surface of reflection layer 200.

Reflection layer 200 includes first dielectric film 201 facing light emitting layer 100 (i.e., on the side closer to light emitting layer 100) and dielectric multi-layer film 210 across first dielectric film 201 from light emitting layer 100 (i.e., on the side distant from light emitting layer 100). More specifically, dielectric multi-layer film 210 is disposed on substrate 300, and first dielectric film 201 is disposed on dielectric multi-layer film 210.

First dielectric film 201 is a layer inserted between light emitting layer 100 and dielectric multi-layer film 210. First dielectric film 201 includes only one layer (single layer).

Dielectric multi-layer film 210 includes at least one laminated film including one pair of dielectric films, namely, second dielectric film 202 and third dielectric film 203. In the laminated film, second dielectric film 202 is disposed on the side closer to light emitting layer 100, and third dielectric film 203 is disposed on the side opposite to light emitting layer 100. In other words, dielectric multi-layer film 210 includes one or more laminated films each including a set of one second dielectric film 202 disposed on the side closer to light emitting layer 100 and one third dielectric film 203 disposed on the side distant from light emitting layer 100 which are paired.

According to the present embodiment, a plurality of laminated films each including second dielectric film 202 and third dielectric film 203 are stacked. More specifically, the laminated film including second dielectric film 202 and third dielectric film 203 is repeatedly stacked to form four layers (i.e., four pairs). In other words, in a direction away from first dielectric film 201, second dielectric film 202 and third dielectric film 203 are alternately stacked in this order to each form four layers. Accordingly, dielectric multi-layer film 210 is composed of a stacked structure which includes a total of eight layers of the dielectric films.

In the three dielectric films (first dielectric film 201, second dielectric film 202, and third dielectric film 203) included in reflection layer 200, second dielectric film 202 has the highest refractive index. More specifically, refractive index $n_2$ of second dielectric film 202 is higher than refractive index $n_1$ of first dielectric film 201 ($n_2 > n_1$), and refractive index $n_3$ of third dielectric film 203 is lower than refractive index $n_2$ of second dielectric film 202 ($n_3 < n_2$).

In addition, refractive index $n_1$ of first dielectric film 201 is lower than refractive index $n_E$ of light emitting layer 100 ($n_1 < n_E$). Furthermore, according to the present embodiment, refractive index $n_3$ of third dielectric film 203 is also lower than refractive index $n_E$ of light emitting layer 100 ($n_3 < n_E$). It should be noted that, although first dielectric film 201 and third dielectric film 203 may be formed using the same material (i.e., may have the same refractive index), first dielectric film 201 and third dielectric film 203 may be formed using different materials (i.e., may have different refractive indexes).

As described above, reflection layer 200 has a configuration in which second dielectric film 202 which is high in the refractive index is sandwiched between first dielectric film 201 which is low in the refractive index and third dielectric film 203 which is low in the refractive index.

In addition, when an average wavelength obtained by integrating, over the visible light region, a spectrum of light emitted from light emitting layer 100 is denoted as $\lambda_{ave}$, the refractive index of first dielectric film 201 is denoted as $n_1$, and a film thickness of first dielectric film 201 is denoted as $d_1$, the relationship of $d_1 \geq \lambda_{ave}/n_1$ is satisfied.

For example, in the case where light emitting layer 100 is a yellow phosphor layer including a yellow phosphor as in the above-described case, when blue light is incident on light emitting layer 100, white light is emitted from first surface 101 (light emission surface) of light emitting layer 100. In this case, the spectrum of light (white light) emitted from light emitting layer 100 is a synthetic spectrum resulting from synthesizing a spectrum of the blue light incident on light emitting layer 100 and a spectrum of yellow fluorescent light emitted in light emitting layer 100. At this time, average wavelength $\lambda_{ave}$ is an average value obtained by integrating the synthetic spectrum. As one example, average wavelength $\lambda_{ave}$ is 550 nm.

It should be noted that, in the case where light emitting layer 100 is a yellow phosphor layer and the light incident on light emitting layer 100 is ultraviolet light, the spectrum of light emitted from light emitting layer 100 is a spectrum of only the yellow fluorescent light emitted in light emitting layer 100. At this time, average wavelength $\lambda_{ave}$ is an average value obtained by integrating the spectrum of only the yellow fluorescent light.

Substrate 300 may be, for example, any of a light-transmissive substrate and a non-transmissive substrate. However, when excitation light is incident on a rear surface of substrate 300, the light-transmissive substrate may be used as substrate 300. As the light-transmissive substrate, for example, a transparent substrate which is high in thermal resistance and light transmittance such as a sapphire substrate, a glass substrate, etc. can be used. It should be noted that the light-transmissive substrate may be a transparent resin substrate including a resin material. Meanwhile, as the non-transmissive substrate, a metal substrate such as an aluminum substrate, etc., or a semiconductor substrate such as a silicon substrate, etc. may be used.

Figure 2:
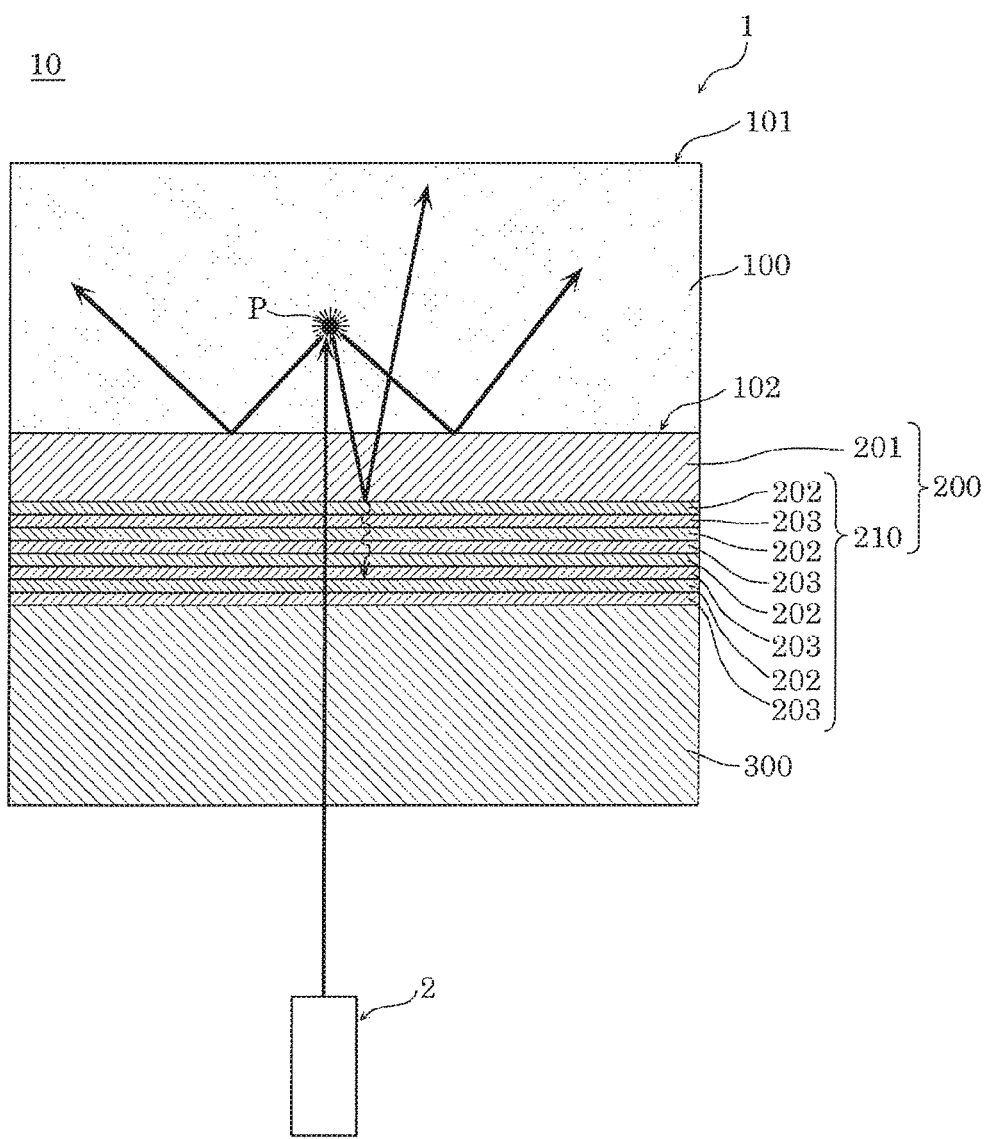
FIG. 2 is diagram which illustrates an example in which the light emitter according to Embodiment 1 is applied to a light emitting device.

The following describes an example of application of light emitter 1 according to the present embodiment, with reference to FIG. 2. FIG. 2 illustrates an example in which light emitter 1 according to Embodiment 1 is applied to light emitting device 10.

As illustrated in FIG. 2, light emitting device 10 includes light emitter 1 and light source 2. Light source 2 is an excitation light source which emits excitation light for causing light emitting layer 100 of light emitter 1 to emit light. Light emitting layer 100 of light emitter 1 emits light upon receiving the excitation light emitted from light source 2.

As light source 2, for example, a semiconductor laser which emits laser light of ultraviolet light or blue light may be used. Since laser light excels in rectilinearly traveling properties, it is possible to cause laser light (excitation light) to be incident on light emitter 1 at an intended incident angle, by using the semiconductor laser as light source 2. It should be noted that light source 2 is not limited to the semiconductor laser, and may be any other excitation light source such as an LED, etc.

According to the present embodiment, light emitter 1 is used as a light-transmissive wavelength conversion element. Accordingly, light source 2 is located under light emitter 1 (i.e., on a side facing substrate 300) so as to cause excitation light of light source 2 to be incident on the rear surface of substrate 300. With this configuration, the excitation light incident on the rear surface of substrate 300 of light emitter 1 is transmitted through substrate 300 and reflection layer 200, and reaches light emitting layer 100. In light emitting layer 100, a wavelength of the excitation light is converted to a predetermined wavelength of light. It should be noted that, although the light emitted from light source 2 is incident perpendicularly to the rear surface of substrate 300 in FIG. 2, the light may be incident obliquely to the rear surface of substrate 300.

In addition, light emitter 1 is a remote-phosphor light emitter. Accordingly, light emitter 1 and light source 2 are spatially separated. With this configuration, it is possible to inhibit deterioration of light emitter 1 (especially, light emitting layer 100) due to heat generated in light source 2.

Here, a specific working example of light emitting device 10 according to Embodiment 1 and the optical characteristics thereof will be described. According to the present working example, Table 1 below shows one example of the conditions set for each of the structural components of light emitter 1. In addition, light source 2 is a semiconductor laser, and emits blue laser light having a peak wavelength of 450 nm.

The phosphor included in light emitting layer 100 is only the yellow phosphor. Accordingly, average wavelength $\lambda_{ave}$ obtained by integrating a spectrum of light in the visible light region emitted from light emitting layer 100 is an average value obtained by integrating a synthetic spectrum resulting from synthesizing a spectrum of blue light emitted from light source 2 and a spectrum of yellow light of light emitting layer 100. According to the present working example, $\lambda_{ave}$ is 550 nm.

In addition, first dielectric film 201 includes only one layer, and second dielectric film 202 and third dielectric film 203 each comprise four layers.

It should be noted that, in Table 1, in the expression ($d1=N \cdot (\lambda_{ave}/4/n_1)$) which represents film thickness $d_1$ (nm) of first dielectric film 201, N is an indefinite number of film thickness $d_1$, and denotes a natural number (N=1, 2, 3, 4, ...).

As illustrated in FIG. 2, since light emitting device 10 according to the present working example includes light emitter 1 which is a light-transmissive and remote-phosphor light emitter, excitation light emitted from light source 2 is incident on the rear surface of substrate 300 of light emitter 1. More specifically, light emitting layer 100 and reflection layer 200 are arranged such that light (excitation light) emitted from light source 2 is incident on reflection layer 200 and light emitting layer 100 in this order, and the light emitted from light source 2 is transmitted through substrate 300 and reflection layer 200, and reaches light emitting layer 100.

Then, when the blue light emitted from light source 2 is incident on light emitting layer 100, the yellow phosphor (YAG phosphor) of light emitting layer 100 absorbs a portion of the blue light emitted from light source 2, and is excited to emit yellow fluorescent light. According to the present working example, the yellow fluorescent light is emitted in light emitting layer 100. Then the yellow light and the blue light of light source 2 which is not absorbed by the yellow phosphor are mixed to be white light, and the white light is emitted from first surface 101 of light emitting layer 100. In other words, white light is extracted from light emitting layer 100.

At this time, as illustrated in FIG. 2, a portion of blue light emitted from light source 2 which has reached luminous point P, for example, is absorbed by the yellow phosphor and converted to yellow light, and another portion of the blue light is not absorbed by the yellow phosphor and scattered by the yellow phosphor. Accordingly, yellow light and blue light are emitted in all directions from luminous point P. In this case, a portion of light (yellow light and blue light) which travels upwardly from luminous point P passes through first surface 101 of light emitting layer 100 and is emitted to the outside. Meanwhile, another portion of the light (yellow light and blue light) which travels upwardly from luminous point P is totally reflected by first surface 101 and travels to reflection layer 200. In addition, light (yellow light and blue light) which travels downwardly from luminous point P travels to reflection layer 200.

When the light which travels to reflection layer 200 has reached reflection layer 200, whether or not the light is reflected by reflection layer 200 depends on an incident angle of the light incident on reflection layer 200 and film

TABLE 1

|  |  | Material | Refractive index | Thickness per one layer (nm) |
| --- | --- | --- | --- | --- |
| Light emitting layer 100 |  | Yellow phosphor (YAG phosphor) | $n_E = 1.8$ | 100,000 (100 µm) |
| Reflection layer 200 | First dielectric film 201 | MgF$_2$ | $n_1 = 1.38$ | $d_1 = N \cdot (\lambda_{ave}/4/n_1)$ |
|  | Second dielectric film 202 | Ta$_2$O$_5$ | $n_2 = 2.19$ | $d_2 = \lambda_{ave}/4/n_2 = 62.8$ |
|  | Third dielectric film 203 | MgF$_2$ | $n_3 = 1.38$ | $d_3 = \lambda_{ave}/4/n_3 = 99.6$ |
| Substrate 300 |  | Sapphire | — | 500,000 (500 µm) | thickness $d_1$ of first dielectric film 201. In other words, the reflectance of light in the visible light region which is reflected by reflection layer 200 depends on the incident angle of the light incident on reflection layer 200 and film thickness $d_1$ of first dielectric film 201.

Figure 3:
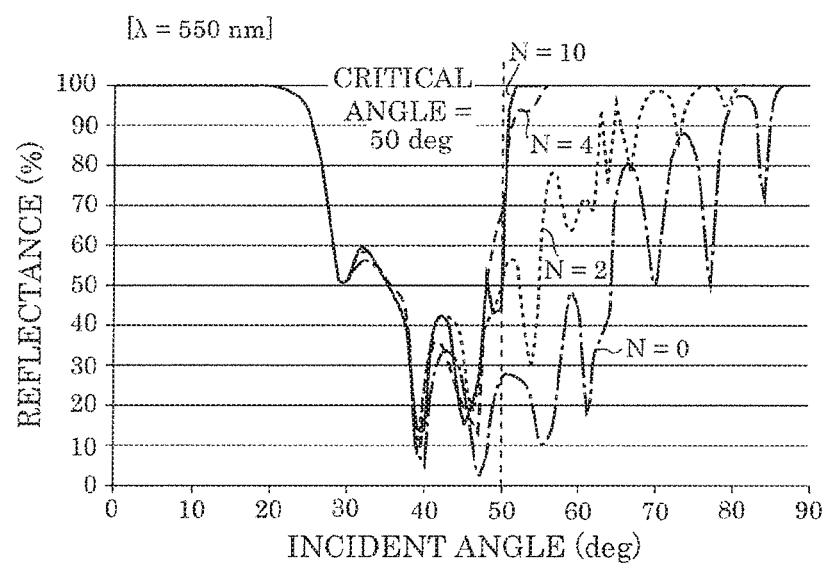
FIG. 3 is diagram which illustrates a relationship between an incident angle and reflectance of a reflection layer, regarding light of which λ=550 nm, in the light emitter according to Embodiment 1.

For example, for light of which λ=550 nm, reflection layer 200 has reflection properties as indicated in FIG. 3. FIG. 3 illustrates a relationship between an incident angle and reflectance of reflection layer 200 regarding light of which λ=550 nm. In addition, FIG. 3 also illustrates reflectance of reflection layer 200 when film thickness $d_1$ of first dielectric film 201 is varied (In other words, when N is varied).

According to the conditions of settings shown in Table 1 described above, the critical angle when the light which is incident on reflection layer 200 is totally reflected by the interface between light emitting layer 100 and reflection layer 200 (first dielectric film 201) is 50 degrees. In this case, as illustrated in FIG. 3, when the critical angle is greater than or equal to 50 degrees, the reflectance increases with increasing film thickness $d_1$ of first dielectric film 201 (i.e., as N becomes greater).

In particular, FIG. 3 indicates that, by increasing film thickness $d_1$ of first dielectric film 201 to be a film thickness corresponding to N=greater than or equal to 4, it is possible to obtain an advantageous effect of substantially total reflection. More specifically, when N≥4 is applied to $d_1=N \cdot (\lambda_{ave}/4/n_1)$ which indicates the film thickness of first dielectric film 201, and $d_1 \geq 4 \cdot (\lambda_{ave}/4/n_1) = \lambda_{ave}/n_1$ is satisfied, it is possible to obtain the advantageous effect of total reflection in a broad region of the interface between light emitting layer 100 and reflection layer 200 (first dielectric film 201) with respect to light at luminous point P. In this manner, it is possible to obtain high reflectance with respect to the light which is incident on reflection layer 200 at a large incident angle.

Furthermore, as illustrated in FIG. 3, reflection layer 200 has reflection properties of having high reflectance with respect to the light which is incident on reflection layer 200 at a small incident angle. This is because light which travels from luminous point P to reflection layer 200 at a small incident angle and is transmitted through first dielectric film 201 is reflected toward light emitting layer 100 according to Bragg reflection caused by the laminated film including second dielectric film 202 and third dielectric film 203 which have different refractive indexes.

Figure 4:
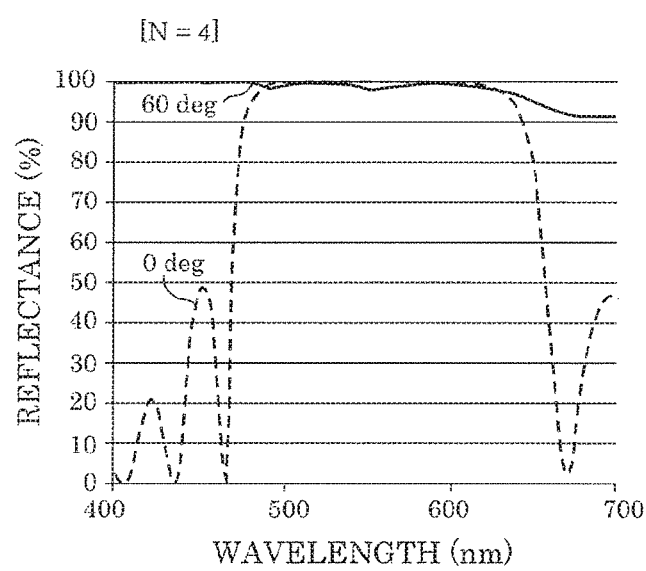
FIG. 4 is a diagram which illustrates a relationship between a wavelength and reflectance regarding the reflection layer in the case where film thickness $d_1$ of a first dielectric film is N=4 ($d_1$=398.4 nm), in the light emitter according to Embodiment 1.

FIG. 4 illustrates a relationship between a wavelength and reflectance of reflection layer 200 of light emitter 1, when film thickness $d_1$ of first dielectric film 201 corresponds to N=4 ($d_1$=398.4 nm). FIG. 4 indicates the cases where an incident angle of light which is incident on reflection layer 200 is 0 degrees and where the incident angle is 60 degrees.

FIG. 4 shows that, with reflection layer 200 according to the present working example, high reflectance is obtained over a broad wavelength range of the visible light region. In addition, it is also shown that rectilinearly traveling light (with incident angle of 0 degrees), which can be excitation light for light emitting layer 100, in the wavelength range from ultraviolet to blue can be transmitted through reflection layer 200. In particular, the rectilinearly traveling ultraviolet light can be transmitted with less reflection in reflection layer 200.

Figure 5:
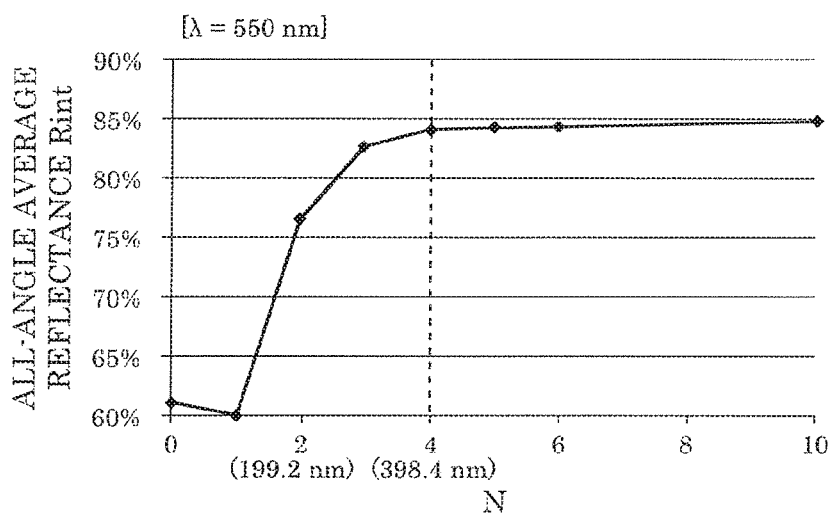
FIG. 5 is a diagram which illustrates a relationship between a film thickness of the first dielectric film and all-angle average reflectance $R_{int}$ of a reflection layer, in the light emitter according to Embodiment 1.

FIG. 5 shows a result of calculating, for reflection layer 200 configured in such a manner as described above, all-angle average reflectance $R_{int}$ relative to film thickness $d_1$ of first dielectric film 201. FIG. 5 indicates a relationship between the film thickness of dielectric film 201 and all-angle average reflectance $R_{int}$ of reflection layer 200, in light emitter 1 according to Embodiment 1.

At this time, all-angle average reflectance $R_{int}$ can be calculated as integral reflectance, using Expression 1 below. In Expression 1, R (θ) indicates an incident angle distribution with reflectance at an interface.

[Math. 1]

$$R_{int} = \frac{\int_0^{\pi/2} R(\theta)\sin\theta d\theta}{\int_0^{\pi/2} \sin\theta d\theta}$$

Expression 1

As illustrated in FIG. 5, use of reflection layer 200 according to the present working example makes it possible to obtain high reflectance in a broad range from a small incident angle to a large incident angle, even with the incident angle being less than 50 degrees that is the critical angle. In this manner, it is possible to obtain high all-angle average reflectance $R_{int}$. In particular, film thickness $d_1$ of first dielectric film 201 is set as N=4 (398.4 nm) or greater so as to satisfy the relationship of $d_1 \geq \lambda_{ave}/n_1$, thereby making it possible to obtain all-angle average reflectance $R_{int}$ as high as approximately 85%.

In other words, by setting film thickness $d_1$ of first dielectric film 201 as N=4 (398.4 nm) or greater, it is possible to inhibit light (evanescent wave) which travels from light emitting layer 100 to reflection layer 200, and oozes out from the interface to reflection layer 200 without being totally reflected by the interface between light emitting layer 100 and reflection layer 200 (first dielectric film 201), from being coupled. In this manner, it is possible to increase the region in which light is totally reflected at the interface between light emitting layer 100 and reflection layer 200 (first dielectric film 201).

It should be noted that, in terms of increasing the region in which light is totally reflected at the interface between light emitting layer 100 and first dielectric film 201, the difference of refractive index between first dielectric film 201 and light emitting layer 100 may be large. Accordingly, when a phosphor layer is used as light emitting layer 100, a phosphor particle may be sealed by ZnO (having a refractive index of approximately 2.0) or may be sealed by a ceramic sintered compact (having a refractive index of approximately 1.8 as a single-crystal) in light emitting layer 100, rather than sealing a phosphor using a transparent resin or liquid glass. In addition, as first dielectric film 201, a material having a low refractive index may be used so as to increase the difference of refractive index between first dielectric film 201 and light emitting layer 100.

As described above, light emitter 1 according to the present embodiment has a configuration in which refractive index $n_E$ of light emitting layer 100 and refractive indexes of three dielectric films included in reflection layer 200 (i.e., refractive index $n_1$ of first dielectric film 201, refractive index $n_2$ of second dielectric film 202, and refractive index $n_3$ of third dielectric film 203) satisfy $n_1 < n_E$, $n_2 > n_1$, and $n_3 < n_2$.

With this configuration, according to the Bragg reflection effect caused by second dielectric film 202 and third dielectric film 203, it is possible to cause light in the visible light region which is emitted from light emitting layer 100 and incident on reflection layer 200 at a small incident angle to be effectively reflected, as illustrated in FIG. 3 and FIG. 4.

In addition, with light emitter 1 according to the present embodiment, first dielectric film 201 which is low in the refractive index has film thickness $d_1$ that is increased so as to satisfy $d_1 \geq \lambda_{ave}/n_1$.

With this configuration, as illustrated in FIG. 3 and FIG. 4, it is possible to totally reflect light in the visible light region which is emitted from light emitting layer 100 and incident on reflection layer 200 at a large incident angle, effectively at an interface between first dielectric film 201 and light emitting layer 100.

As described above, with light emitter 1 according to the present embodiment, since the total reflection and Bragg reflection are both realized by reflection layer 200, it is possible to efficiently reflect light in the visible light region which is emitted from light emitting layer 100 and incident on reflection layer 200, in a broad range from a small incident angle to a large incident angle. In this manner, it is possible to obtain high all-angle average reflectance $R_{int}$ by reflection layer 200 as illustrated in FIG. 5. Accordingly, light absorption loss inside light emitter 1 is inhibited, and thus it is possible to implement light emitter 1 with a high level of light extraction efficiency.

It should be noted that, although white light is emitted from light emitting layer 100 using blue light (excitation light) emitted from light source 2 and yellow light (fluorescent light) of light emitting layer 100 according to the above-described working example, the present disclosure is not limited to this example.

For example, ultraviolet light (having, for example, a peak wavelength of 405 nm) may be used as the excitation light emitted from light source 2, instead of blue light. In this case, light emitting layer 100 of light emitter 1 is an excitation-type light emitting layer which emits light upon receiving excitation light having a wavelength shorter than a wavelength of light in an effective reflection region of reflection layer 200. The effective reflection region of reflection layer 200 is a region in which reflection properties are obtained in reflection layer 200, and is the visible light region according to the present embodiment. Accordingly, light emitting layer 100 emits light upon receiving excitation light having a shorter wavelength (i.e., ultraviolet light) than a wavelength of light in the visible light region.

When ultraviolet light is used as the excitation light emitted from light source 2, a yellow phosphor, a red phosphor, a green phosphor, and a blue phosphor can be used as the phosphors contained in light emitting layer 100. With this configuration, since the phosphors are excited to respectively emit yellow fluorescent light, red fluorescent light, green fluorescent light, and blue fluorescent light from light emitting layer 100, the colors of light are mixed and white light can be emitted from light emitting layer 100.

In this case, as one example, it is possible to use a YAG phosphor as the yellow phosphor, a SCASN phosphor or a CASN phosphor as the red phosphor, a LuAG phosphor as the green phosphor, and a BAM phosphor as the blue phosphor. In addition, it is possible to obtain white light having an intended color temperature, by appropriately adjusting the density, etc., of each of the phosphors.

It should be noted that, since ultraviolet light is used as excitation light in this example, reflection layer 200 may be designed in view of the light of which $\lambda_{ave}=550$ nm, as with the above-described working example, and the material and film thickness of each of first dielectric film 201, second dielectric film 202, and third dielectric film 203 may be the same as those employed in the above-described working example.

In addition, blue light (having, for example, a peak wavelength of 450 nm) may be used as the excitation light emitted from light source 2, instead of ultraviolet light. In this case, it is possible to use a yellow phosphor, a red phosphor, and a green phosphor as the phosphors contained in light emitting layer 100. With this configuration, since the phosphors are excited to respectively emit yellow fluorescent light, red fluorescent light, and green fluorescent light from light emitting layer 100, the colors of light are mixed and white light can be emitted from light emitting layer 100.

In this case, as one example, it is possible to use a YAG phosphor as the yellow phosphor, a SCASN phosphor or a CASN phosphor as the red phosphor, and a LuAG phosphor as the green phosphor. In addition, it is possible to obtain white light having an intended color temperature, by appropriately adjusting the density, etc., of each of the phosphors.

It should be noted that, since blue light is used as excitation light in this example, reflection layer 200 may be designed in view of the light whose wavelength is shifted to the side of long wavelength (for example, $\lambda_{ave}=600$ nm), while causing blue light to be transmitted through reflection layer 200. In this case, as the material and film thickness of each of the dielectric films included in reflection layer 200, for example, first dielectric film 201 may be $MgF_2$ film ($n_1=1.38$, $d_1=434.8$ nm (N=4)), second dielectric film 202 may be $Ta_2O_5$ film ($n_2=2.19$, $d_2=69.1$ nm), and third dielectric film 203 may be $MgF_2$ film ($n_3=1.38$, $d_3=108.7$ nm).

Embodiment 2

Figure 6:
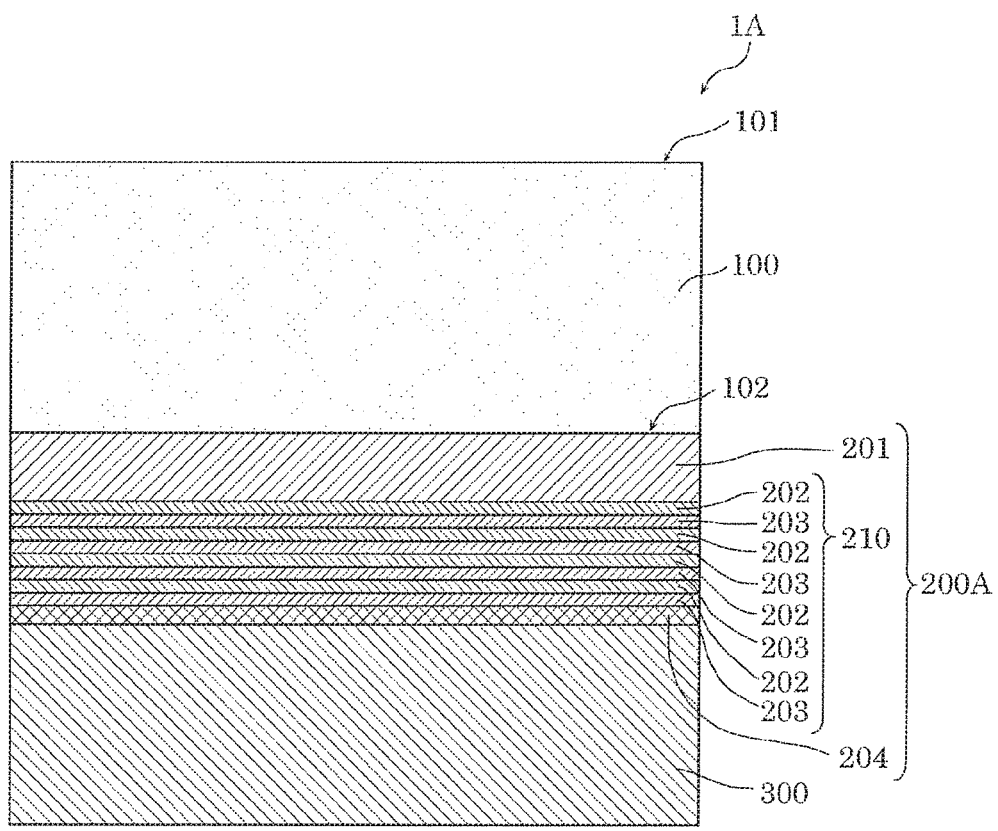
FIG. 6 is a cross-sectional view of a light emitter according to Embodiment 2.

The following describes light emitter 1A according to Embodiment 2 with reference to FIG. 6. FIG. 6 is a cross-sectional view of light emitter 1A according to Embodiment 2.

As illustrated in FIG. 6, light emitter 1A according to the present embodiment is different from light emitter 1 according to the above-described Embodiment 1 in that reflection layer 200A includes metallic film 204. It should be noted that light emitter 1A has the same configuration as light emitter 1 according to the above-described Embodiment 1, other than that reflection layer 200A includes metallic film 204.

Metallic film 204 is disposed on a surface of dielectric multi-layer film 210 on the side opposite to the surface closer to light emitting layer 100. According to the present embodiment, metallic film 204 is disposed between substrate 300 and third dielectric film 203.

As metallic film 204, it is possible to use, for example, an aluminum film including aluminum (Al) or a silver film including silver (Ag), etc. The thickness of metallic film 204 ranges from 50 nm to 200 nm, for example.

Figure 7:
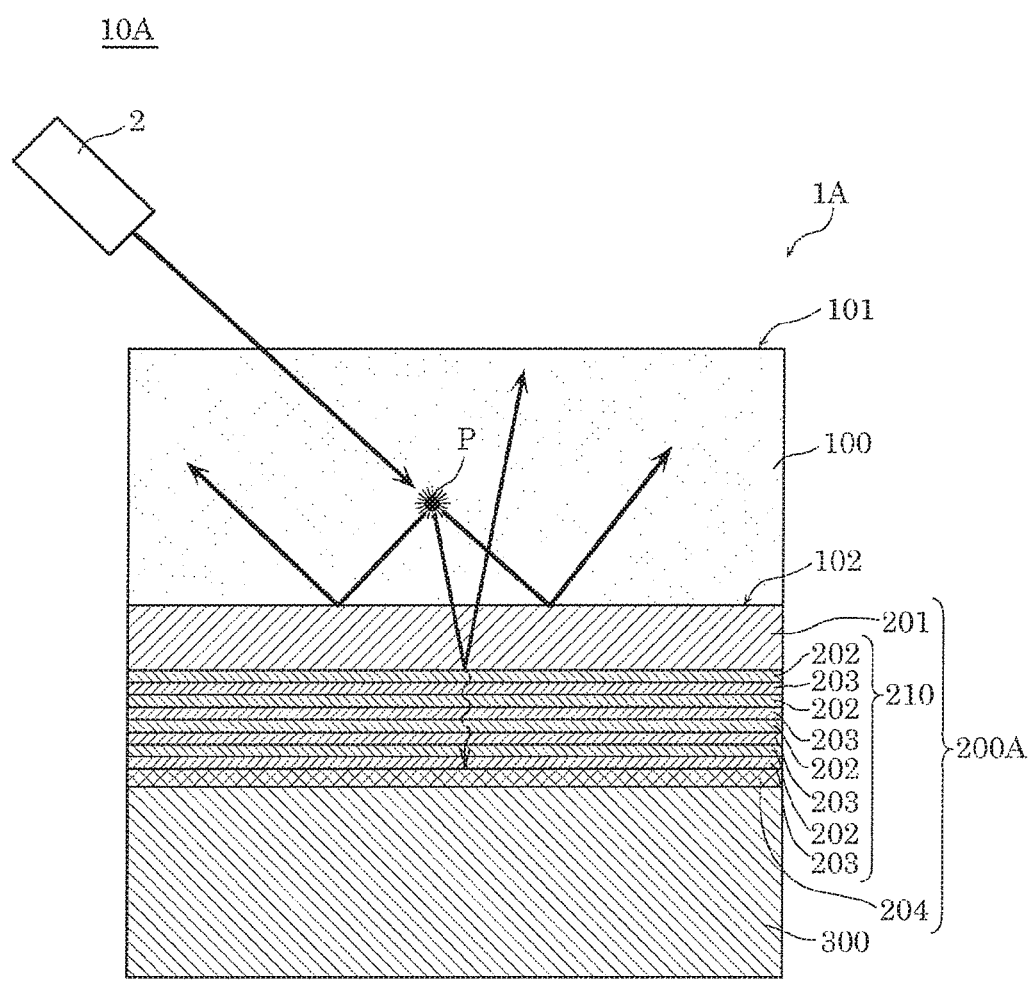
FIG. 7 is diagram which illustrates an example in which the light emitter according to Embodiment 2 is applied to a light emitting device.

The following describes an application example of light emitter 1A according to the present embodiment, with reference to FIG. 7. FIG. 7 illustrates an example in which light emitter 1A according to Embodiment 2 is applied to light emitting device 10A.

As illustrated in FIG. 7, light emitting device 10A includes light emitter 1A and light source 2. In the same manner as the above-described Embodiment 1, light source 2 is an excitation light source which emits excitation light for causing light emitting layer 100 of light emitter 1A to emit light, and light emitting layer 100 of light emitter 1A emits light upon receiving the excitation light emitted from light source 2.

According to the present embodiment, light emitter 1A is not used as a light-transmissive wavelength conversion element but as a reflective wavelength conversion element.

Accordingly, light source 2 is disposed above light emitter 1 (i.e., on a side facing light emitting layer 100) so as to cause excitation light of light source 2 to be incident on first surface 101 of light emitting layer 100. In other words, first surface 101 is a light incident surface as well as a light emission surface (light extraction surface). With this configuration, excitation light emitted from light source 2 directly reaches light emitting layer 100. It should be noted that, although light emitted from light source 2 is obliquely incident on first surface 101 of light emitting layer 100 in FIG. 7, light emitted from light source 2 may be perpendicularly incident on first surface 101 of light emitting layer 100.

In addition, light emitter 1A is a remote-phosphor light emitter as with light emitter 1 according to Embodiment 1. Accordingly, light emitter 1A and light source 2 are spatially separated.

Here, a specific working example of light emitting device 10A according to Embodiment 2 and the optical characteristics thereof will be described. According to the present working example, Table 2 below shows one example of the conditions set for each of the structural components of light emitter 1A. A semiconductor laser which emits blue laser light having a peak wavelength of 450 nm is used as light source 2 incident on reflection layer 200A and the film thickness of the laminated film including second dielectric film 202 and third dielectric film 203. In other words, the reflectance of light in the visible light region which is reflected by reflection layer 200A depends on the incident angle of the light incident on reflection layer 200A and the film thickness of the laminated film including second dielectric film 202 and third dielectric film 203.

Figure 8:
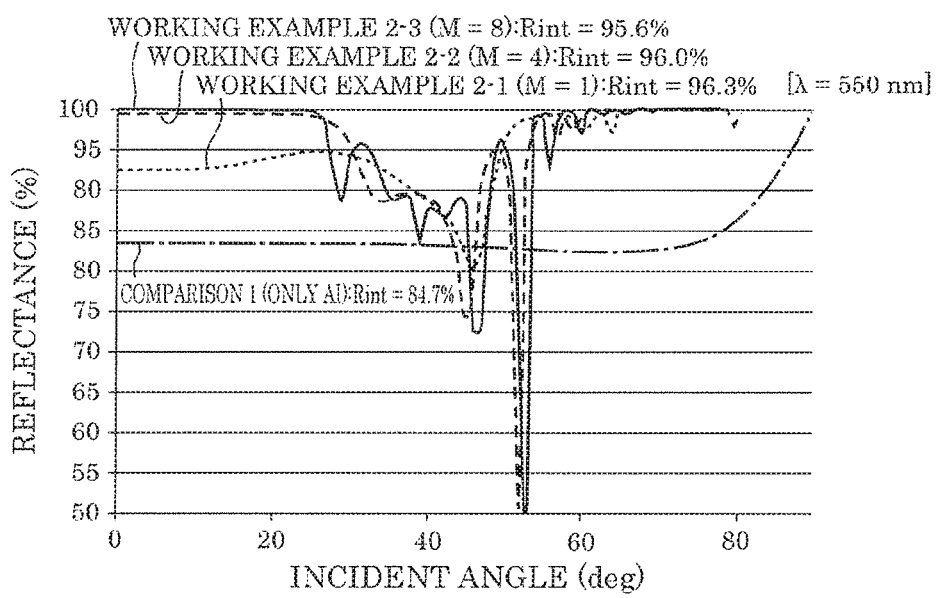
FIG. 8 is diagram which illustrates a relationship between an incident angle and reflectance of a reflection layer, regarding light of which λ=550 nm, in the light emitter according to Embodiment 2.

For example, regarding light of which $\lambda$=550 nm, reflection layer 200A has reflection properties as indicated in FIG. 8. FIG. 8 illustrates a relationship between an incident angle and reflectance in reflection layer 200A regarding the light of which $\lambda$=550 nm. In addition, FIG. 8 also illustrates reflectance of reflection layer 200 when the film thickness of the laminated film of second dielectric film 202 and third dielectric film 203 is varied (in other words, when M is varied).

It should be noted that, although the reflectance of light in the visible light region which is reflected by reflection layer 200A also depends on the film thickness of first dielectric film 201, the film thickness of first dielectric film 201 according to the present working example is set to 398.4 nm (N=4) as a minimum film thickness of first dielectric film 201 with which reflection layer 200A indicates a high reflection effect, as calculated in Embodiment 1 described above.

TABLE 2

| | | Material | Refractive index | Thickness per one layer (nm) |
|---|---|---|---|---|
| Light emitting layer 100 | | Yellow phosphor (YAG phosphor) | $n_E$ = 1.8 | 100,000 (100 µm) |
| Reflection layer 200A | First dielectric film 201 | MgF$_2$ | $n_1$ = 1.38 | $d_1$ = 398.4 (N = 4) |
| | Second dielectric film 202 | Ta$_2$O$_5$ | $n_2$ = 2.19 | $d_2$ = M · ($\lambda_{ave}$/4/$n_2$) |
| | Third dielectric film 203 | MgF$_2$ | $n_3$ = 1.38 | $d_3$ = M · ($\lambda_{ave}$/4/$n_3$) |
| | Metallic layer 204 | Al | — | 100 |
| Substrate 300 | | Sapphire | — | 500,000 (500 µm) |

The phosphor included in light emitting layer 100 is only the yellow phosphor. Accordingly, average wavelength $\lambda_{ave}$ obtained by integrating a spectrum of light in the visible light region emitted from light emitting layer 100 is 550 nm as with Embodiment 1 described above.

In addition, first dielectric film 201 includes only one layer, and the number of times of repeating the stacking of the laminated film including second dielectric film 202 and third dielectric film 203 is M times. In other words, the number of laminated films (i.e., the number of pairs of dielectric films) including second dielectric film 202 and third dielectric film 203 is M, and second dielectric film 202 and third dielectric film 203 comprise M second dielectric films 202 and M dielectric films 203, respectively. It should be noted that M represents a natural number (M=1, 2, 3, 4, . . . ).

As illustrated in FIG. 7, in light emitting device 10A according to the present working example, the yellow phosphor in light emitting layer 100 is excited to emit yellow fluorescent light when blue light emitted from light source 2 is incident on light emitting layer, in the same manner as the above-described Embodiment 1. Then the yellow light and the blue light emitted from light source 2 are mixed to be white light, and the white light is emitted from first surface 101 of light emitting layer 100.

At this time, as illustrated in FIG. 7, whether or not the light which travels from luminous point P to reflection layer 200A (yellow light and blue light) is reflected by reflection layer 200A depends on the incident angle of light which is In addition, even with the conditions of settings shown in Table 2 indicated above, the critical angle when the light which is incident on reflection layer 200A is totally reflected by the interface between light emitting layer 100 and reflection layer 200A (first dielectric film 201) is 50 degrees as with Embodiment 1 described above.

In FIG. 8, curve lines denoted as "working example 2-1 (M=1)", "working example 2-2 (M=4)", and "working example 2-3 (M=8)" each indicate reflection properties of reflection layer 200A according to the present working example. Among the aspects of "working example 2-1 (M=1)", "working example 2-2 (M=4)", and "working example 2-3 (M=8)", the number of laminated films M including second dielectric film 202 and third dielectric film 203 are different from one another.

In addition, in FIG. 8, the curve line denoted as "Comparison 1 (only Al)" indicates reflection properties of reflection layer 200A of light emitter 1A in which first dielectric film 201, second dielectric film 202, and third dielectric film 203 are not included. In other words, "Comparison 1 (only Al)" is an aspect in which reflection layer 200A includes only metallic film 204.

FIG. 8 indicates that, according to the present working example in which metallic film 204 is inserted to reflection layer 200A, the reflectance significantly improves in a broad range of incident angles, compared to the above-described Embodiment 1 (see FIG. 3).

In other words, since film thickness $d_1$ of first dielectric film 201 is also set as a film thickness corresponding to N=4 in the present working example in the same manner as the above-described Embodiment 1, it is possible to effectively obtain the advantageous effect of total reflection at the interface between light emitting layer 100 and reflection layer 200A (first dielectric film 201). In this manner, it is possible to obtain high reflectance for the light which is incident on reflection layer 200A at a large incident angle.

In addition, in the same manner as the above-described Embodiment 1, it is also possible to cause light which is incident on reflection layer 200A at a small incident angle to be effectively reflected toward light emitting layer 100, according to Bragg reflection caused by the laminated film including second dielectric film 202 and third dielectric film 203 which have different refractive indexes.

In addition, since metallic film 204 is used in reflection layer 200A according to the present working example, the level of the reflection effect caused by the above-described total reflection and the level of the reflection effect caused by the above-described Bragg reflection are raised by metallic reflection caused by metallic film 204. In this manner, as illustrated in FIG. 8, it is possible to obtain high reflectance for the light which is incident on reflection layer 200A at a large incident angle and the light which is incident on reflection layer 200A at a small incident angle.

As described above, use of reflection layer 200A according to the present working example makes it possible to obtain high reflectance in a broad range from a small incident angle to a large incident angle. In this manner, it is possible to obtain all-angle average reflectance $R_{int}$ as high as approximately 95%, as indicated in FIG. 8.

In particular, it is understood that high all-angle average reflectance $R_{int}$ can be obtained even when compared with the case where reflection layer 200A includes only metallic film 204 (the case of "Comparison 1 (only Al)" in FIG. 8).

It should be noted that, when the number of laminated films M including second dielectric film 202 and third dielectric film 203 is increased, all-angle average reflectance $R_{int}$ is not increased but rather slightly decreased. This is because, although the reflectance for the light which is incident on reflection layer 200A at a small incident angle (e.g., light which is perpendicularly incident on reflection layer 200A) is improved by increasing the number of laminated films M, the reflectance for the light which is incident on reflection layer 200A at a large incident angle decreases in contrast. In particular, the reflectance significantly decreases where the incident angle is in proximity to critical angle of 50 degrees. This is thought to be due to the fact that the interference effect of light increases as a result of increasing the number of laminated films M.

Figure 9:
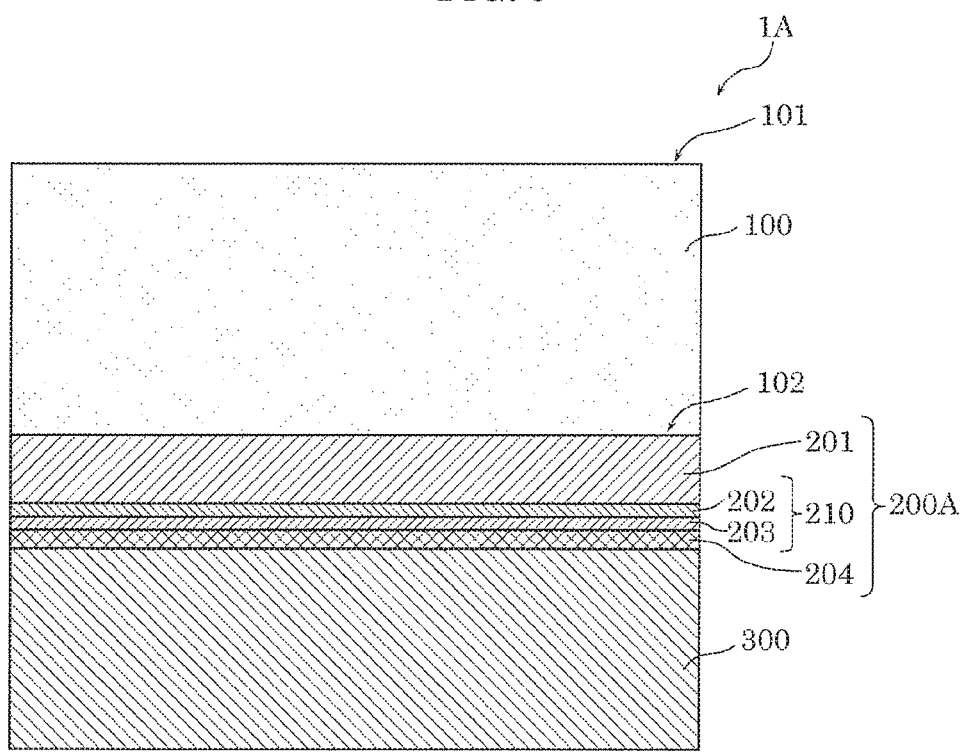
FIG. 9 is a cross-sectional view of the light emitter according to Embodiment 2 in the case where M=1.

Accordingly, when metallic film 204 is used for reflection layer 200A, the number of laminated films M including second dielectric film 202 and third dielectric film 203, for example, is 1 (M=1) as illustrated in FIG. 9. FIG. 9 is a cross-sectional view of light emitter 1A according to Embodiment 2 in the case where M=1.

Figure 10:
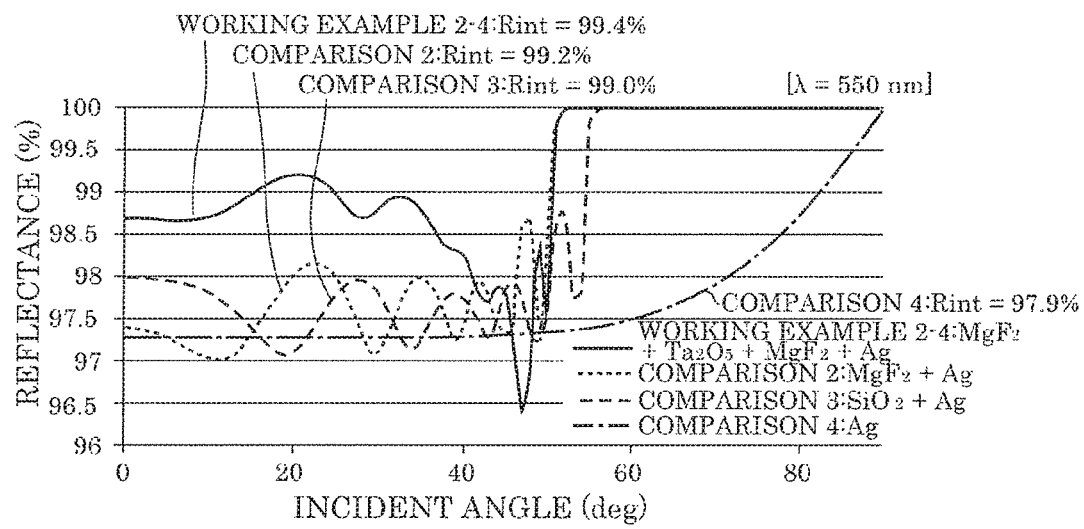
FIG. 10 is a diagram which illustrates a relationship between an incident angle and reflectance of a reflection layer, regarding light of which λ=550 nm, in the light emitter according to a variation of Embodiment 2.

Here, the reflection properties of reflection layer 200A of light emitter 1A having the configuration illustrated in FIG. 9 is evaluated. The result of the evaluation is shown in FIG. 10. FIG. 10 illustrates a relationship between an incident angle and reflectance in reflection layer 200A of light emitter 1A having the configuration illustrated in FIG. 9, regarding light of which λ=550 nm. It should be noted that, in the present variation, metallic film 204 of reflection layer 200A is not an aluminum film but a silver film (having a film thickness of 150 nm).

In FIG. 10, the curve line denoted as "working example 2-4" indicates reflection properties of reflection layer 200A according to the present variation. More specifically, "working example 2-4" is an aspect in which metallic film 204 of reflection layer 200A is changed from an aluminum film (100 nm) to a silver film (150 nm) in the configuration of "working example 2-1 (M−1)" illustrated in FIG. 8.

The curve line denoted as "Comparison 2" indicates reflection properties according to an aspect in which second dielectric film 202 ($Ta_2O_5$) is removed from reflection layer 200A having the configuration of "working example 2-4".

The curve line denoted as "Comparison 3" indicates reflection properties according to an aspect in which second dielectric film 202 ($Ta_2O_5$) and third dielectric film 203 ($MgF_2$) are removed from reflection layer 200A having the configuration of "working example 2-4", and first dielectric film 201 is changed from the $MgF_2$ film to the $SiO_2$ film ($n_1=1.46$, $d_1=\lambda_{ave}/n1=376.7$ nm). In other words, the aspect of "Comparison 3" is an aspect in which first dielectric film 201 is changed from the $MgF_2$ film to the $SiO_2$ film in the configuration of "Comparison 2".

The curve line denoted as "Comparison 4" indicates reflection properties according to a configuration in which first dielectric film 201, second dielectric film 202, and third dielectric film 203 are not included in the configuration of "working example 2-4". In other words, "Comparison 4" is an aspect in which reflection layer 200A includes only metallic film 204 formed of a silver film.

As illustrated in FIG. 10, according to the aspect of "working example 2-4", reflection layer 200A includes first dielectric film 201, second dielectric film 202, and third dielectric film 203, and thus it is understood that the reflectance improves in a broad range of incident angles and high all-angle average reflectance $R_{int}$ can be obtained, compared to the aspect in which first dielectric film 201, second dielectric film 202, and third dielectric film 203 are not included in reflection layer 200A ("Comparison 2", "Comparison 3", and "Comparison 4").

In addition, although the number of laminated films M including second dielectric film 202 and third dielectric film 203 is 1 in each of the aspect of "working example 2-4" illustrated in FIG. 10 and the aspect of "working example 2-1 (M=1)" illustrated in FIG. 8, all-angle average reflectance $R_{int}$ is higher in the aspect of "working example 2-4" illustrated in FIG. 10 than in the aspect of "working example 2-1 (M=1)" illustrated in FIG. 8.

More specifically, all-angle average reflectance $R_{int}$ of the aspect of "working example 2-1 (M=1)" illustrated in FIG. 8 is 96.3% whereas all-angle average reflectance $R_{int}$ of the aspect of "working example 2-4" illustrated in FIG. 10 is 99.4%. As described above, it is possible to improve all-angle average reflectance $R_{int}$ by changing metallic film 204 of reflection layer 200A from an aluminum film to a silver film.

As described above, in the same manner as Embodiment 1 described above, light emitter 1A according to the present embodiment has a configuration in which refractive index $n_E$ of light emitting layer 100 and refractive indexes of three dielectric films included in reflection layer 200A (i.e., refractive index $n_1$ of first dielectric film 201, refractive index $n_2$ of second dielectric film 202, and refractive index $n_3$ of third dielectric film 203) satisfy the relationships: $n_1 < n_E$; $n_2 > n_1$; and $n_3 < n_2$.

With this configuration, it is possible to cause light in the visible light region which is emitted from light emitting layer 100 and incident on reflection layer 200A at a small incident angle to be effectively reflected, according to Bragg reflection caused by second dielectric film 202 and third dielectric film 203.

In addition, in the same manner as Embodiment 1 described above, with light emitter 1A according to the present embodiment, film thickness $d_1$ of first dielectric film 201 which is low in the refractive index is increased so as to satisfy $d_1 \geq \lambda_{ave}/n_1$.

With this configuration, it is possible to cause light in the visible light region which is incident on reflection layer 200A from light emitting layer 100 at a large incident angle to be effectively totally reflected at an interface between first dielectric film 201 and light emitting layer 100.

Moreover, with light emitter 1A according to the present embodiment, reflection layer 200A includes metallic film 204.

With this configuration, as illustrated in FIG. 8 and FIG. 10, it is possible to obtain high reflectance in a broad range of incident angles of light which is incident on reflection layer 200A from light emitting layer 100, and thus it is possible to improve all-angle average reflectance $R_{int}$.

In this manner, with light emitter 1A according to the present embodiment, metallic reflection is employed while total reflection and Bragg reflection are both achieved by reflection layer 200A, and thus it is possible to obtain all-angle average reflectance $R_{int}$ which is higher than all-angle average reflectance $R_{int}$ obtained in Embodiment 1. With this configuration, light absorption loss inside light emitter 1A is inhibited, and thus it is possible to implement light emitter 1A with a high level of light extraction efficiency.

It should be noted that, although white light is emitted from light emitting layer 100 using blue light (excitation light) emitted from light source 2 and yellow light (phosphor) of light emitting layer 100 according to the present embodiment, in the same manner as Embodiment 1, the present disclosure is not limited to this example.

For example, as described above, the excitation light emitted from light source 2 may be ultraviolet light (having a peak wavelength of 405 nm, for example), and a yellow phosphor, a red phosphor, a green phosphor, and a blue phosphor may be employed as phosphors included in light emitting layer 100, so as to cause white light to be emitted from light emitting layer 100.

Alternatively, the excitation light emitted from light source 2 may be blue light (having a peak wavelength of 450 nm, for example), and a yellow phosphor, a red phosphor, and a green phosphor may be employed as phosphors included in light emitting layer 100, so as to cause white light to be emitted from light emitting layer 100.

Embodiment 3

Figure 11:
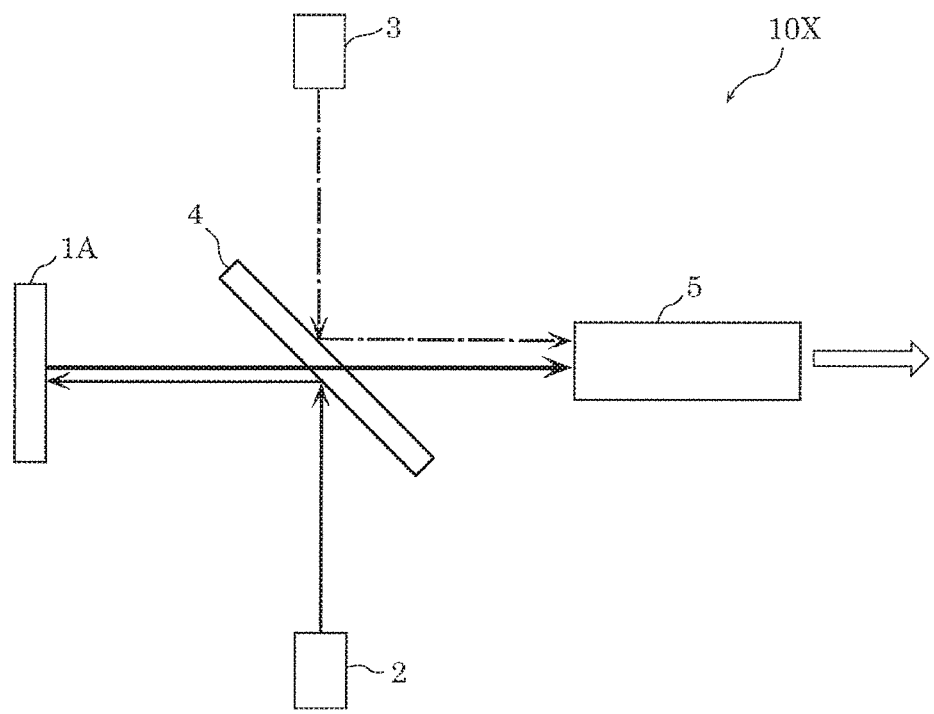
FIG. 11 is a diagram which schematically illustrates a configuration of a light emitting device according to Embodiment 3.

The following describes light emitting device 10X according to Embodiment 3, with reference to FIG. 11. FIG. 11 is a diagram which schematically illustrates a configuration of light emitting device 10X according to Embodiment 3.

As illustrated in FIG. 11, light emitting device 10X according to the present embodiment includes light emitter 1A according to Embodiment 2, light source 2 (first light source), light source 3 (second light source), wavelength selecting element 4, and integration rod 5.

According to the present embodiment, light emitting layer 100 of light emitter 1A is a phosphor layer including a phosphor. More specifically, light emitting layer 100 is a yellow phosphor layer including a yellow phosphor.

Light source 2 is an excitation light source which emits excitation light for causing a phosphor contained in light emitting layer 100 of light emitter 1A to be excited to emit fluorescent light. Light source 2, for example, emits ultraviolet light or blue light. According to the present embodiment, light source 2 is a semiconductor laser which emits blue light.

Light source 3 is an illumination light source which emits light for generating illumination light (white light) by being mixed with light emitted from light emitting layer 100 of light emitter 1A. According to the present embodiment, light emitting layer 100 of light emitter 1A is a yellow phosphor layer, and thus light source 3 is a semiconductor laser or an LED which emits blue light.

Wavelength selecting element 4 selects and transmits incident light according to a wavelength. According to the present embodiment, wavelength selecting element 4 transmits light in a wavelength region of a certain range as well as reflects light in a wavelength region of the other range. More specifically, wavelength selecting element 4 transmits light emitted from light emitter 1A, and reflects light emitted from light source 2 and light source 3.

According to the present embodiment, light emitter 1A emits yellow light, and thus wavelength selecting element 4 has a property of transmitting yellow light. In addition, light source 2 and light source 3 emits blue light, and thus wavelength selecting element 4 has a property of transmitting blue light. In this case, wavelength selecting element 4 reflects blue light emitted from light source 2 to be incident on light emitter 1A, and reflects blue light emitted from light source 3 to be incident on integration rod 5. As wavelength selecting element 4 described above, for example, a dichroic mirror may be employed.

Integration rod 5 receives incident light by an incident end face, and emits received incident light with a uniformed luminance distribution. According to the present embodiment, yellow light emitted from light emitter 1A and blue light emitted from light source 3 are incident on integration rod 5. In this manner, integration rod 5 receives the yellow light emitted from light emitter 1A and the blue light emitted from light source 3 by the incident end face, uniforms a luminance distribution, and emits the light as white light.

It should be noted that a lens may be disposed in front of and back of integration rod 5. For example, a condenser lens may be disposed on an entrance-side of integration rod 5, and a projection lens may be disposed on an exit-side of integration rod 5.

Light emitting device 10X configured in this manner may be used as a light source of an illuminating apparatus or a projector, for example. In other words, white light emitted from integration rod 5 is used as illumination light or image light.

Light emitting device 10X configured in this manner includes light emitter 1A according to Embodiment 1 which excels in light extraction efficiency, and thus it is possible to implement a light emitting device with high efficiency.

It should be noted that, although the present disclosure is configured as a light emitting device according to the present embodiment, the present disclosure may be configured as a light source system including light emitter 1, light source 2, light source 3, wavelength selecting element 4, and integration rod 5.

In addition, although light emitter 1A according to Embodiment 2 is used in the present embodiment, the present embodiment is not limited to this example, and the light emitting device may be implemented by using light emitter 1 according to Embodiment 1. In this case, light source 2 may be dispose on the rear-surface side of substrate 300 of light emitter 1.

(Variation 1)

Figure 12:
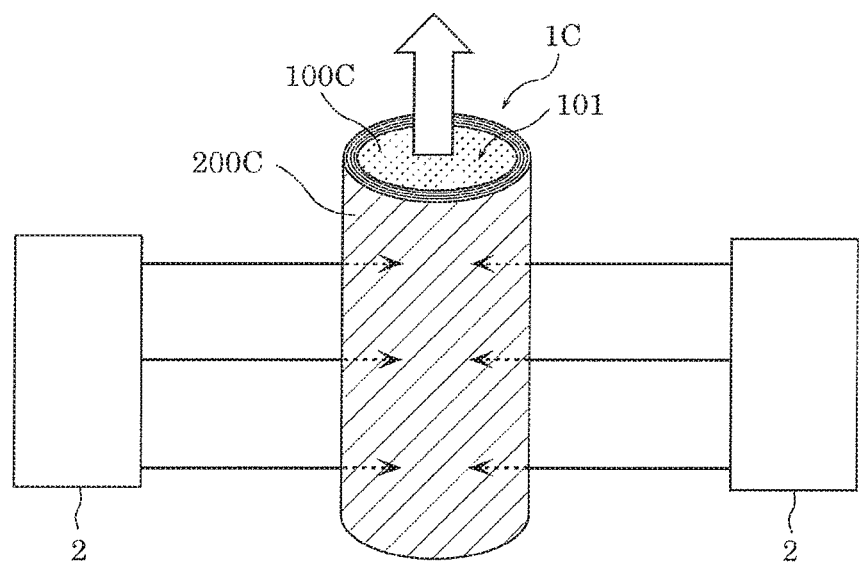
FIG. 12 is a diagram which schematically illustrates a configuration of a light emitter according to Variation 1.

Next, light emitter 1C according to Variation 1 will be described with reference to FIG. 12. FIG. 12 is a diagram which schematically illustrates a configuration of light emitter 1C according to Variation 1.

As illustrated in FIG. 12, light emitter 1C according to the present variation includes light emitting layer 100C and reflection layer 200C. Light emitter 1C according to the present variation is a light-transmissive light emitter in which excitation light is transmitted through reflection layer 200C as with light emitter 1 according to Embodiment 1 described above.

Light emitting layer 100C according to the present variation and light emitting layer 100 according to Embodiment 1 described above differ only in shapes, and are identical other than the shapes. More specifically, light emitting layer 100C according to the present variation is a columnar structure with an end face being first surface 101 (light emission surface). According to the present variation, light emitting layer 100C has a cylindrical shape. In addition, light emitting layer 100C is an excitation-type light emitting layer which emits light upon receiving excitation light, as with light emitting layer 100 according to Embodiment 1 described above.

In addition, reflection layer 200C according to the present variation and reflection layer 200 according to Embodiment 1 described above differ only in shapes, and are identical other than the shapes. More specifically, reflection layer 200C according to the present variation is formed on a lateral surface of the columnar structure that forms light emitting layer 1000, and is a tubular structure. Since light emitting layer 100C has a cylindrical shape according to the present variation, reflection layer 200C has a thin cylindrical shape.

Although not illustrated in the diagram, reflection layer 200C includes first dielectric film 201, second dielectric film 202, and third dielectric film 203, as with reflection layer 200 according to Embodiment 1 described above. First dielectric film 201, second dielectric film 202, and third dielectric film 203 are stacked in the stated order on the lateral surface of the columnar structure that forms light emitting layer 100C. In other words, in reflection layer 200C, first dielectric film 201 is positioned innermost, and third dielectric film 203 is positioned outermost.

It should be noted that the material and refractive index $n_E$ of light emitting layer 100C and the materials and refractive indexes of the three dielectric films included in reflection layer 200C are the same as those in Embodiment 1.

Light emitter 1C configured in this manner is formed as a light-transmissive phosphor rod, and light for excitation emitted from light source 2 (excitation light) is incident on light emitter 1C from the lateral surface, as illustrated in FIG. 12.

As described above, with light emitter 1C according to the present variation, it is possible to obtain high all-angle average reflectance $R_{int}$ by reflection layer 200C as with light emitter 1 according to Embodiment 1 described above, and thus it is possible to implement light emitter 1C which has high light extraction efficiency.

In addition, with the configuration of light emitter 1C according to the present variation, it is possible to reduce excitation energy density. In addition, by employing the configuration of light emitter 1C according to the present variation, it is possible to reduce a light emission region of light emitting layer 100C. For example, the cylindrical structure that forms light emitting layer 1000 is made thin and long so as to be small-sized and elongated, thereby making it possible to gain light emission amount of light emitting layer 100C while reducing the light emission region of light emitting layer 100C.

Figure 13:
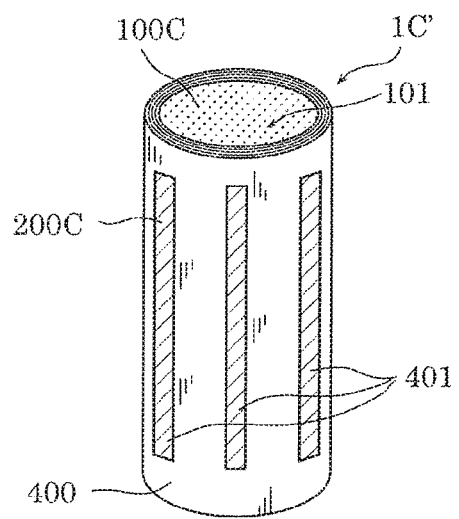
FIG. 13 is a diagram which schematically illustrates a configuration of another aspect of the light emitter according to Variation 1.

It should be noted that the configuration of light emitter 1C' illustrated in FIG. 13 may be employed. Light emitter 1C' illustrated in FIG. 13 has a configuration in which metallic layer 400 having a plurality of slits 401 is formed on a surface of light emitter 1C illustrated in FIG. 12. Slits 401 are each an excitation light entrance portion for transmitting light for excitation emitted from light source 2. Aluminum or silver may be used as a material of metallic layer 400.

As described above, with light emitter 1C' illustrated in FIG. 13, since metallic layer 400 is formed as an outer shell layer, it is possible to implement a light emitter which excels in heat dissipation performance as well as to obtain high light extraction efficiency. It should be noted that, since metallic layer 400 of light emitter 1C' illustrated in FIG. 13 serves as metallic film 204 of reflection layer 200A according to Embodiment 2 described above, side reflectance is increased, and thus it is possible to obtain higher light extraction efficiency compared to light emitter 1C illustrated in FIG. 12.

(Variation 2)

Figure 14:
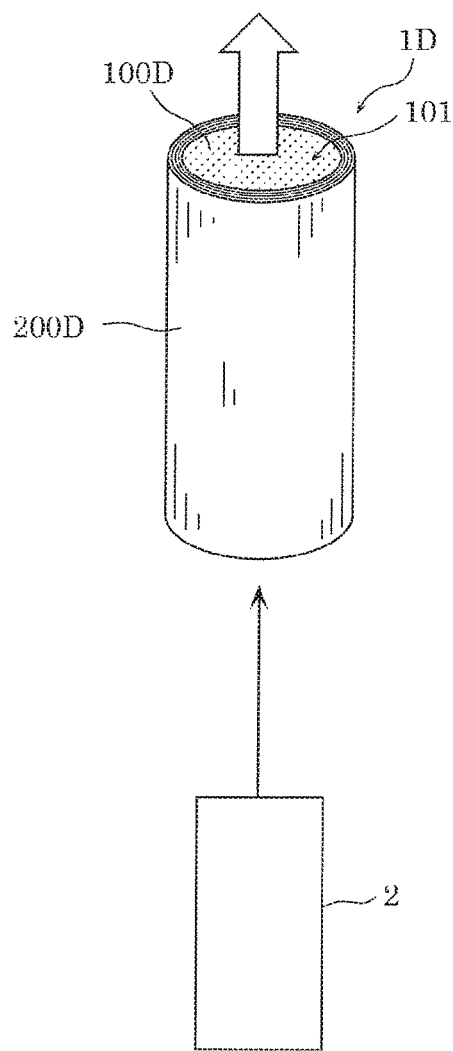
FIG. 14 is a diagram which schematically illustrates a configuration of a light emitter according to Variation 2.
Figure 15:
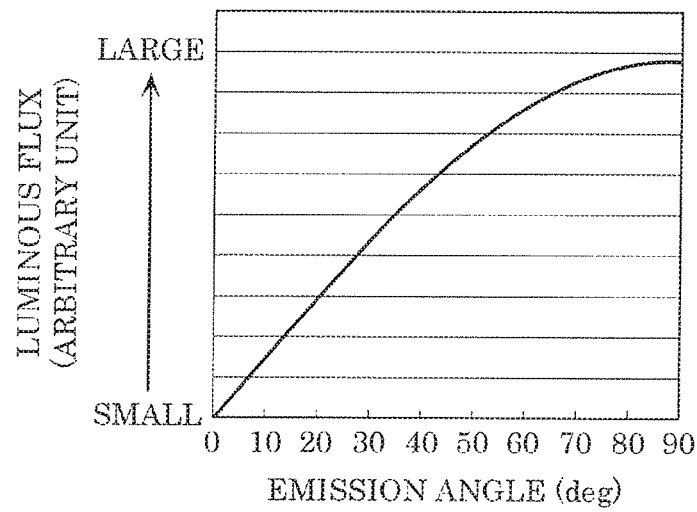
FIG. 15 is a diagram which illustrates a relationship between an emission angle and a luminous flux of light emitted from a light emitting layer (i.e., an angle distribution of a radiant flux in consideration of a solid angle)
Figure 16:
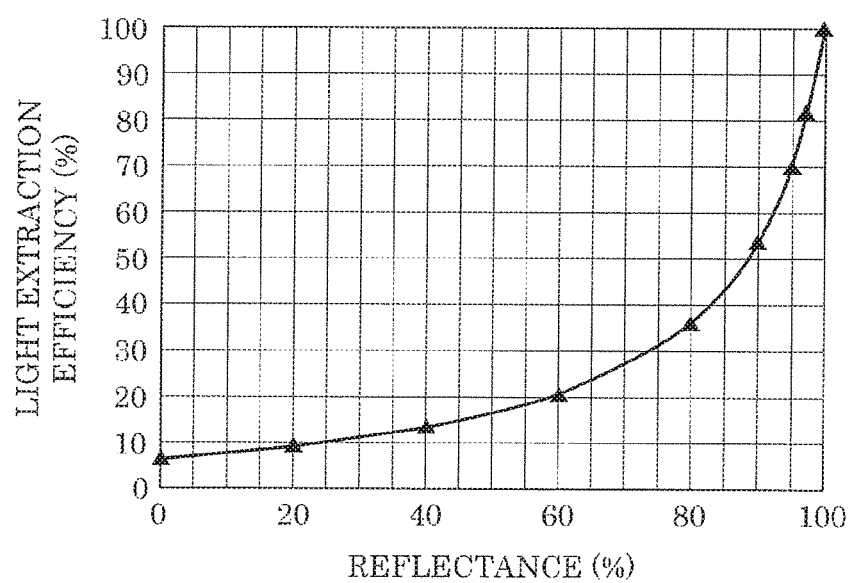
FIG. 16 is a diagram which illustrates a relationship between reflectance and light extraction efficiency of a reflection film that is formed on a light emitting layer.

Next, light emitter 1D according to Variation 2 will be described with reference to FIG. 14. FIG. 14 is a diagram which schematically illustrates a configuration of light emitter 1D according to Variation 2.

As illustrated in FIG. 14, light emitter 1D according to the present variation includes light emitting layer 100D and reflection layer 200D. Light emitter 1D according to the present variation is a reflective light emitter in which excitation light is not transmitted through reflection layer 200D, as with light emitter 1A according to Embodiment 2 described above.

Light emitting layer 100D according to the present variation and light emitting layer 100 according to Embodiment 2 described above differ only in shapes, and are identical other than the shapes. More specifically, light emitting layer 100D according to the present variation is a columnar structure including a pair of end faces one of which is first surface 101 that is a light emission surface and the other is an incident surface for excitation light. In other words, light emitted from light emitting layer 100 may be emitted from an end face that is the light incident surface, or may be emitted from an end face opposite to the end face that is the light incident surface. According to the present variation, light emitting layer 100D has a cylindrical shape. In addition, light emitting layer 100D is an excitation-type light emitting layer which emits light upon receiving excitation light, as with light emitting layer 100 according to Embodiment 2 described above.

In addition, reflection layer 200D according to the present variation and reflection layer 200A according to Embodiment 2 described above differ only in shapes, and are identical other than the shapes. More specifically, reflection layer 200D according to the present variation is formed on a lateral surface of the columnar structure that forms light emitting layer 100D, and is a tubular structure. Since light emitting layer 100D has a cylindrical shape according to the present variation, reflection layer 200D has a thin cylindrical shape.

Although not illustrated in the diagram, reflection layer 200D includes first dielectric film 201, second dielectric film 202, third dielectric film 203, and metallic film 204 as with reflection layer 200 according to Embodiment 2 described above. First dielectric film 201, second dielectric film 202, third dielectric film 203, and metallic film 204 are stacked in the stated order on the lateral surface of the columnar structure that forms light emitting layer 100D. In other words, in reflection layer 200D, first dielectric film 201 is positioned innermost, and metallic film 204 is positioned outermost.

It should be noted that the material and refractive index $n_E$ of light emitting layer 100D, the materials and refractive indexes of three dielectric films included in reflection layer 200D, and the material, etc. of metallic film 204 are the same as those in Embodiment 2.

Light emitter 1D configured in this manner is formed as a reflective phosphor rod, and light for excitation emitted from light source 2 (excitation light) is incident on light emitter 1D from the lateral surface, as illustrated in FIG. 14.

As described above, with light emitter 1D according to the present variation, it is possible to obtain high all-angle average reflectance $R_{int}$ by reflection layer 200D as with light emitter 1A according to Embodiment 2 described above, and thus it is possible to implement light emitter 1D which has high light extraction efficiency.

In addition, with the configuration of light emitter 1D according to the present variation, it is possible to reduce a light emission region of light emitting layer 100D, as well as to reduce excitation energy density as with light emitter 1C according to Variation 1 described above.

Furthermore, with light emitter 1D according to the present variation, since metallic film 204 of reflection layer 200D is positioned outermost, it is possible to implement a light emitter which excels in heat dissipation performance as well as the light extraction efficiency.

(Other Variations, Etc.)

Although the light emitter and light emitting device according to the present disclosure have been described based on the above-described embodiments, the present disclosure is not limited to the above-described embodiments.

For example, although light emitted from light source 2 is incident on the rear surface of substrate 300 according to Embodiment 1 described above, the present disclosure is not limited to this example, and light emitted from light source 2 may be incident on first surface 101 of light emitting layer 100. In this case, first surface 101 is a light incident surface as well as a light emission surface.

In addition, in each of the embodiments described above, first dielectric film 201, second dielectric film 202, and third dielectric film 203 are not limited to the above-described metal compound, but may be aerogel or the like.

In addition, although each of the foregoing embodiments describes the case where the light emitting layer of the light emitter is an excitation-type light emitting layer which emits light upon receiving excitation light, the present disclosure is not limited to this example. For example, the light emitting layer may be a semiconductor light emitting element such as an LED, or a self-emissive light emitting element such as an organic EL, etc.

In addition, although a phosphor layer has been described as an example of the excitation-type light emitting layer in each of the above-described embodiments, the excitation-type light emitting layer is not limited to the phosphor layer. The excitation-type light emitting layer may be a wavelength conversion layer or the like which converts excitation light into light having a wavelength different from a wavelength of the excitation light. In this case, the wavelength conversion layer includes a wavelength converting material which, for example, absorbs excitation light and emits light having a wavelength different from a wavelength of the excitation light. Examples of the wavelength converting material include a semiconductor, a metal complex, an organic dye, a pigment, etc.

In addition, in each of the above-described embodiments, the materials of the light emitting layer are not limited to inorganic materials but may be semiconductor materials such as organic materials, quantum dots, etc.

It should be noted that the present disclosure also includes other forms in which various modifications apparent to those skilled in the art are applied to the embodiments or forms in which structural components and functions in the embodiments are arbitrarily combined within the scope of the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A light emitter, comprising:
   a light emitting layer which includes a light emission surface, and emits visible light via the light emission surface; and
   a reflection layer
   which is disposed on a surface of the light emitting layer different from the light emission surface,
   which reflects the visible light emitted from the light emitting layer, and
   which includes a first dielectric film facing the light emitting layer, and a dielectric multi-layer film disposed below the first dielectric film to be further from the light emitting layer than the first dielectric film,
   wherein
   the dielectric multi-layer film includes at least one layer of laminated film, each layer of the at least one layer of laminated film includes a pair of a second dielectric film and a third dielectric film,
   the second dielectric film is disposed to be closer to the light emitting layer than the third dielectric film,
   the first dielectric film has a refractive index lower than a refractive index of the light emitting layer,
   the second dielectric film has a refractive index higher than the refractive index of the first dielectric film,
   the third dielectric film has a refractive index lower than the refractive index of the second dielectric film, and
   $d_1 \geq \lambda_{ave}/n_1$ is satisfied where $\lambda_{ave}$ denotes an average wavelength of a spectrum of the visible light emitted via the light emitting layer, $n_1$ denotes the refractive index of the first dielectric film, and $d_1$ denotes a film thickness of the first dielectric film.

2. The light emitter according to claim 1, wherein
   the light emitting layer is an excitation-type light emitting layer which emits light upon receiving excitation light having a wavelength shorter than a wavelength of light in an effective reflection region of the reflection layer, and
   the light emitting layer and the reflection layer are disposed such that the excitation light is incident on the reflection layer and the light emitting layer in a stated order.

3. The light emitter according to claim 2, further comprising:
a light-transmissive substrate having a first surface and a second surface opposite to the first surface, wherein
the reflection layer is disposed above the first surface of the light-transmissive substrate,
the light emitting layer is disposed above the reflection layer, and
the excitation light is incident on the second surface of the light-transmissive substrate.

4. The light emitter according to claim 1, wherein the light emitting layer is a phosphor layer.

5. The light emitter according to claim 4, wherein the phosphor layer is an inorganic layer in which a phosphor particle is sealed by zinc oxide (ZnO).

6. The light emitter according to claim 4, wherein the phosphor layer is a ceramic layer in which a phosphor particle is sealed by a ceramic sintered compact.

7. The light emitter according to claim 1, wherein
the light emitting layer is a columnar structure including an end face which is the light emission surface, and
the reflection layer is disposed on a lateral surface of the columnar structure.

8. The light emitter according to claim 1, wherein
the dielectric multi-layer film includes a first surface facing the light emitting layer and a second surface opposite to the first surface, and
the reflection layer includes a metallic film disposed on the second surface of the dielectric multi-layer film.

9. The light emitter according to claim 8, wherein the metallic film includes silver.

10. The light emitter according to claim 8, wherein the light emitting layer is an excitation-type light emitting layer which emits light upon receiving excitation light through the light emission surface, the excitation light being incident on the light emitting layer.

11. The light emitter according to claim 8, wherein a total number of layers of laminated film included in the at least one layer of laminated film is one.

12. The light emitter according to claim 8, wherein
the light emitting layer is an excitation-type light emitting layer which emits light upon receiving excitation light, and is a columnar structure including a first end face and a second end face, the first end face being the light emission surface and the second end face being an incident surface for the excitation light, and
the reflection layer is disposed on a lateral surface of the columnar structure.

13. The light emitter according to claim 1, wherein
the first dielectric film and the third dielectric film include a same material, and
the second dielectric film includes a material different from the material of the first dielectric film.

14. The light emitter according to claim 1, wherein
the first dielectric film and the third dielectric film include magnesium fluoride ($MgF_2$), and
the second dielectric film includes tantalum oxide ($Ta_2O_5$).

15. The light emitter according to claim 2, wherein
the excitation light is blue light, and
the light emitting layer is a phosphor layer containing a yellow phosphor which emits yellow light.

16. The light emitter according to claim 2, wherein
the excitation light is ultraviolet light, and
the light emitting layer is a phosphor layer containing a yellow phosphor which emits yellow light, a red phosphor which emits red light, a green phosphor which emits green light, and a blue phosphor which emits blue light.

17. A light emitting device, comprising:
the light emitter according to claim 1; and
a light source which emits excitation light, wherein
the light emitting layer of the light emitter is an excitation-type light emitting layer which emits light upon receiving the excitation light emitted from the light source.

18. The light emitting device according to claim 17, wherein
the light emitter and the light source are spatially separated.

19. The light emitting device according to claim 18, wherein
the light source comprises a first light source that is an excitation light source and a second light source that is an illumination light source, and
the light emitting device further comprises a wavelength selecting element which transmits light emitted from the light emitter, and reflects light emitted from the first light source and the second light source.

20. An illuminating apparatus comprising the light emitting device according to claim 17.

* * * * *